(12) United States Patent
Garmong

(10) Patent No.: US 8,596,978 B2
(45) Date of Patent: Dec. 3, 2013

(54) WIND TURBINE

(75) Inventor: Victor H. Garmong, Kennerdell, PA (US)

(73) Assignee: Pioneer Energy Products, LLC, Franklin, PA (US)

( * ) Notice: Subject to any disclaimer, the term of this patent is extended or adjusted under 35 U.S.C. 154(b) by 956 days.

(21) Appl. No.: 12/625,856

(22) Filed: Nov. 25, 2009

(65) Prior Publication Data

US 2011/0120108 A1 May 26, 2011

(51) Int. Cl.
*F01D 5/00* (2006.01)
*F01D 5/22* (2006.01)

(52) U.S. Cl.
USPC ..................................... 416/132 B; 416/195

(58) Field of Classification Search
USPC .... 416/132 A, 195, 196 R, 196 A, 132 B, 41, 416/240; 415/4.3, 4.5, 47, 48, 4.1
See application file for complete search history.

(56) References Cited

U.S. PATENT DOCUMENTS

| | | | |
|---|---|---|---|
| 5,660,527 A | 8/1997 | Deering et al. | |
| 5,823,749 A | 10/1998 | Green | |
| 6,327,957 B1 | 12/2001 | Carter, Sr. | |
| 6,612,810 B1 | 9/2003 | Olsen et al. | |
| 6,890,152 B1 | 5/2005 | Thisted | |
| 7,217,091 B2 | 5/2007 | LeMieux | |
| 7,418,820 B2 | 9/2008 | Harvey et al. | |
| 2006/0244264 A1* | 11/2006 | Anderson et al. | 290/44 |
| 2007/0098555 A1 | 5/2007 | Siegfriedsen | |
| 2008/0069696 A1* | 3/2008 | Ball | 416/132 B |

OTHER PUBLICATIONS 7 pages from the website www.gizmag.com/earthtronics-honeywell-windgate-wind-turbine/11990/, entitled "Honeywell Wind Turbine is a Breeze to Run—and a Light One at That," dated Jun. 17, 2009.

* cited by examiner

*Primary Examiner* — Dwayne J White
(74) *Attorney, Agent, or Firm* — K&L Gates LLP

(57) ABSTRACT

A wind turbine is disclosed. Various embodiments of the wind turbine have a turbine rotator assembly that, when rotated by the wind, provides a rotational input motion to a power generation unit. The turbine rotator assembly may include a central rotator bearing and an outer ring. A plurality of flexible fins are mounted in tension between the outer ring and the central rotator bearing such that the fins are able to flex when contacted by wind at certain wind speeds. The fins may be mounted at an angle and at a twisted configuration to facilitate flexing of the turbine rotator assembly in a direction that is opposite to the direction in which the wind is blowing. Various embodiments employ electrical generator units and other embodiments employ hydraulic pump and motor arrangements that are coupled to an electrical generator.

25 Claims, 9 Drawing Sheets

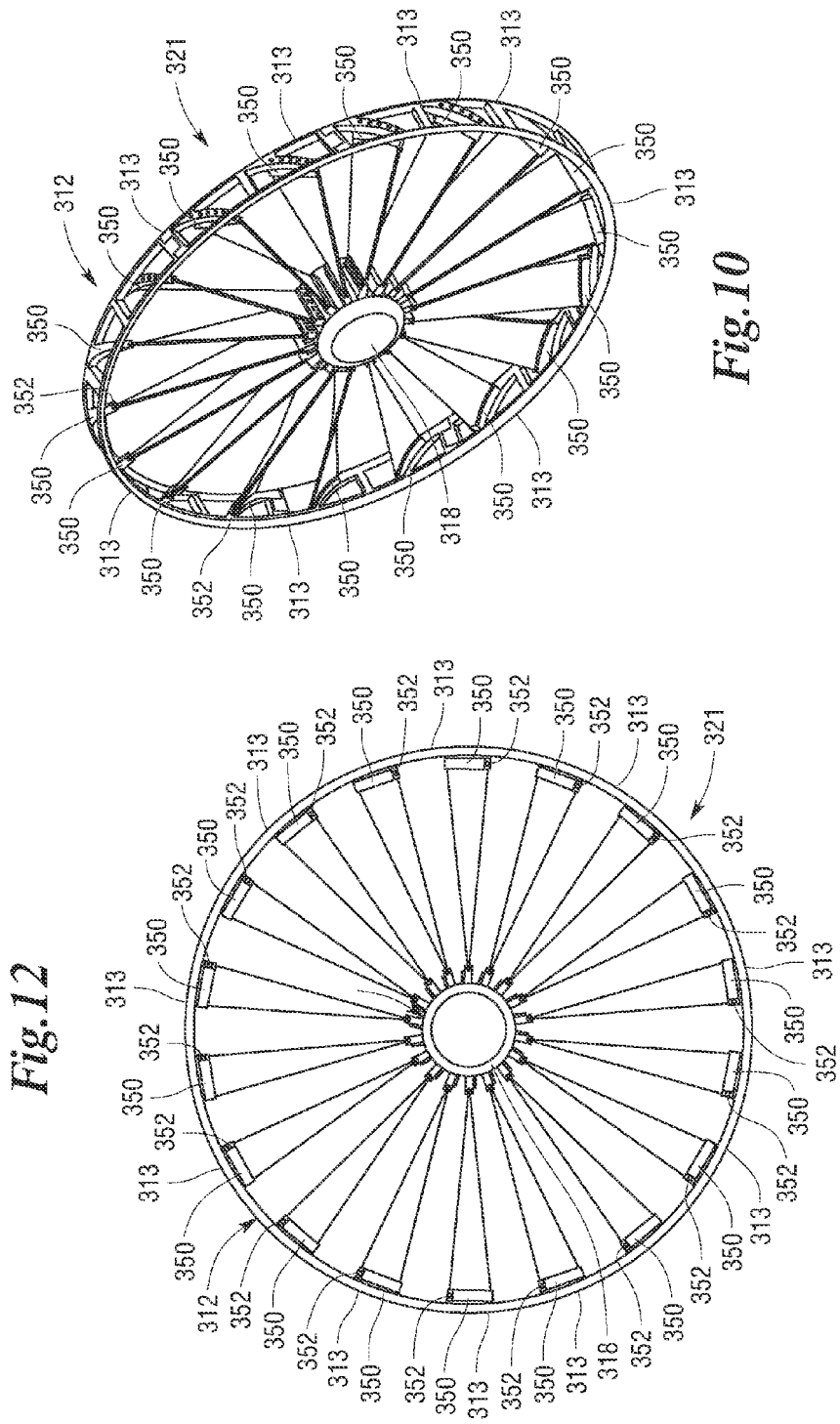

WIND TURBINE

FIELD OF THE INVENTION

The present invention generally relates to electrical power generation devices and, more particularly, to wind turbines with blade configurations for avoiding extensive ice build-up and wind loading on the support mast.

BACKGROUND

Over the years, wind turbines have become increasing popular for providing a relatively inexpensive source of electrical energy. With this growing interest, considerable efforts have been made to develop wind turbines that are reliable and efficient.

In general, most wind turbines comprise a rotor that is generally mounted to a tower or other structure. A plurality (often three) of long blades are mounted to the rotor and are oriented such that wind contact with the blades imparts a rotational motion to the rotor. In short, the blades transform wind energy into a rotational torque or force that drives one or more generators that are operably coupled to the rotor through an arrangement of gears. The gears convert the inherently slow rotational speed of the rotor to a rotational speed which can be advantageously used by a generator to generate electrical energy. Gearless direct drive turbines also exist.

One problem often encountered when using wind turbines is the accumulation of ice on the turbine blades. Icing frequently adversely affects performance of the wind turbines during winter seasons. For example, at times, icing may be so severe that it prevents the turbines from producing power despite the existence of ideal wind conditions. In addition, build-up of ice on the blades may cause the rotor to become imbalanced and thereby place undesirable stress on the blades and the drive system. In those applications wherein the wind turbine is operating in a remote, unmonitored area, the turbine's diminished effectiveness due to icing may largely go undetected. In severe cases, the turbine may fail to produce the electricity need to keep critical monitoring and other equipment operating. If there is no personnel on site to monitor and remedy the condition, catastrophic results may occur. Even in applications wherein the wind turbine is constantly monitored, the environment and the manner in which the turbine is mounted may make servicing difficult.

Over the years, a variety of different solutions have been developed for deicing wind turbine blades. For example, some devices require the use of resistive heating wires on the blades. Other approaches involve the application of inflatable boots, alcohol, heat, etc. to the blades. Such approaches enjoy varying degrees of effectiveness. However, these approaches typically involve the use of additional equipment which ads expense to the turbine and are largely ineffective on turbines that are located in remote locations and are not easily accessible for maintenance purposes.

In addition, the masts that support the wind turbines must be designed to withstand the loads resulting from a maximum expected level of wind speed. Thus, those wind turbines that are located in locations wherein high wind speeds may be encountered often require complex and extensive mounting mast arrangements.

Thus, there is a need for a wind turbine blade arrangement that is configured to prevent the build-up of ice on the blades without the use of additional electrical, air powered, or chemical equipment.

There is a further need for a wind turbine blade arrangement that serves to reduce the wind loading experienced by the support mast.

The foregoing discussion is intended only to illustrate some of the shortcomings present in the field of the invention at the time, and should not be taken as a disavowal of claim scope.

BRIEF SUMMARY

In accordance with one general aspect of the present invention, there is provided a wind turbine that may include a tower attachment assembly that may have a power generation unit mounted thereto. A central rotator bearing may be operably coupled to the power generation unit such that rotation of the central rotator bearing provides rotational input motion to the power generation unit. An outer ring may be fabricated from a first material and have a plurality of blades or fins attached thereto. The fins may also be attached to the central rotator bearing. The plurality of fins may be manufactured from a second flexible material and also be mounted in tension between the outer ring and the central rotator bearing such that the plurality of fins flex in response to encountering a range of wind speeds.

In accordance with other general aspects of the present invention, there is provided a wind turbine that may include a tower attachment assembly that may support a first electrical generator that may be operably coupled to a second electrical generator. The wind turbine may further include a turbine rotator assembly that comprises a central rotator bearing that may be operably coupled to the first electrical generator such that rotation of the central rotator bearing provides rotational input motion to the first electrical generator. The turbine rotator assembly may further include an outer ring that is fabricated from a first material. A plurality of blades or fins may be attached to the outer ring and the central rotator bearing. The plurality of fins may be manufactured from a second flexible material and be mounted in tension between the outer ring and the central rotator bearing such that the plurality of fins flex in response to encountering a range of wind speeds. The wind turbine may further comprise an elongated tail section that is operably coupled to the tower attachment assembly such that the elongated tail section is substantially perpendicular to the turbine rotator assembly when the turbine rotator assembly encounters a first range of wind speeds and wherein the elongated tail section is substantially parallel to the turbine rotator assembly at wind speeds greater than the first range of wind speeds. At least one tail fin may be coupled to the elongated tail section.

In accordance with still other general aspects of the present invention, there is provided a wind turbine that comprises a housing. A support structure may be mounted to the housing for facilitating rotational travel of the housing about a vertical axis. A turbine rotator assembly may be rotatably supported on the housing for rotational travel relative thereto in response to contact by wind. In various embodiments, the turbine rotator assembly may comprise a central rotator bearing that is rotatably supported on the housing. The turbine rotator assembly may further comprise an outer ring that is fabricated from a first material and have a plurality of flexible blades or fins attached thereto. The fins may also be attached to the central rotator bearing. The plurality of fins may be manufactured from a second flexible material and be mounted in tension between the outer ring and the central rotator bearing such that the plurality of fins flex in response to encountering a range of wind speeds. The wind turbine may further comprise a drive shaft that is rotatably supported within the housing and is coupled to the central rotator bearing. A drive sprocket may be coupled to the drive shaft and driven sprocket may be supported on a secondary shaft. A drive chain may extend between the drive sprocket and the driven sprocket. A drive gear may be coupled to the secondary shaft and a pump gear may be coupled to a hydraulic pump. The pump gear may be in meshing engagement with the drive gear. A hydraulic motor may be operably coupled to the hydraulic pump by a hydraulic supply line and a hydraulic return line. A hydraulic fluid tank may be in hydraulic communication with the hydraulic motor. A proportioning valve may be in hydraulic communication with the hydraulic supply line and the hydraulic fluid tank. An electrical generator may be operably coupled to the hydraulic motor. The wind turbine may further comprise at least one tail fin that is coupled to the housing.

In accordance with yet another embodiment of the present invention, there is provided a wind turbine that includes a housing that supports a power generation unit. The wind turbine further includes a turbine rotator assembly that comprises a central rotator bearing that is rotatably supported on the housing and is configured to interact with the power generation unit such that rotation of the central rotator bearing provides rotational input motion to the power generation unit. A plurality of flexible fins are attached in tension between the central rotator bearing and an outer ring, such that when the fin assembly encounters wind blowing in a first direction at a speed greater than a first wind speed, the outer ring will deflect in a second direction that is opposite to the first direction.

BRIEF DESCRIPTION OF THE FIGURES

The accompanying drawings, which are incorporated in and constitute a part of this specification, illustrate embodiments of the invention, and, together with the general description of the invention given above, and the detailed description of the embodiments given below, serve to explain the principles of the present invention.

FIG. 10 is a perspective view of another wind turbine rotator assembly embodiment of the present invention;

FIG. 11 is an elevational view of the wind turbine rotator assembly of FIG. 10;

FIG. 12 is a top view of the wind turbine rotator assembly of FIGS. 10 and 11;

DETAILED DESCRIPTION

Figure 1:
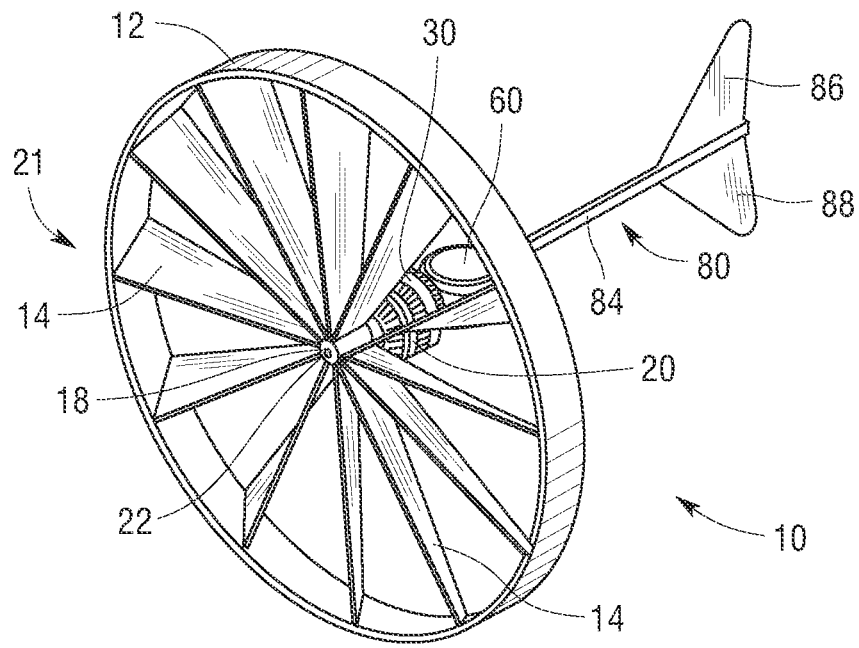
FIG. 1 is a front perspective view of a wind turbine embodiment of the present invention.
Figure 2:
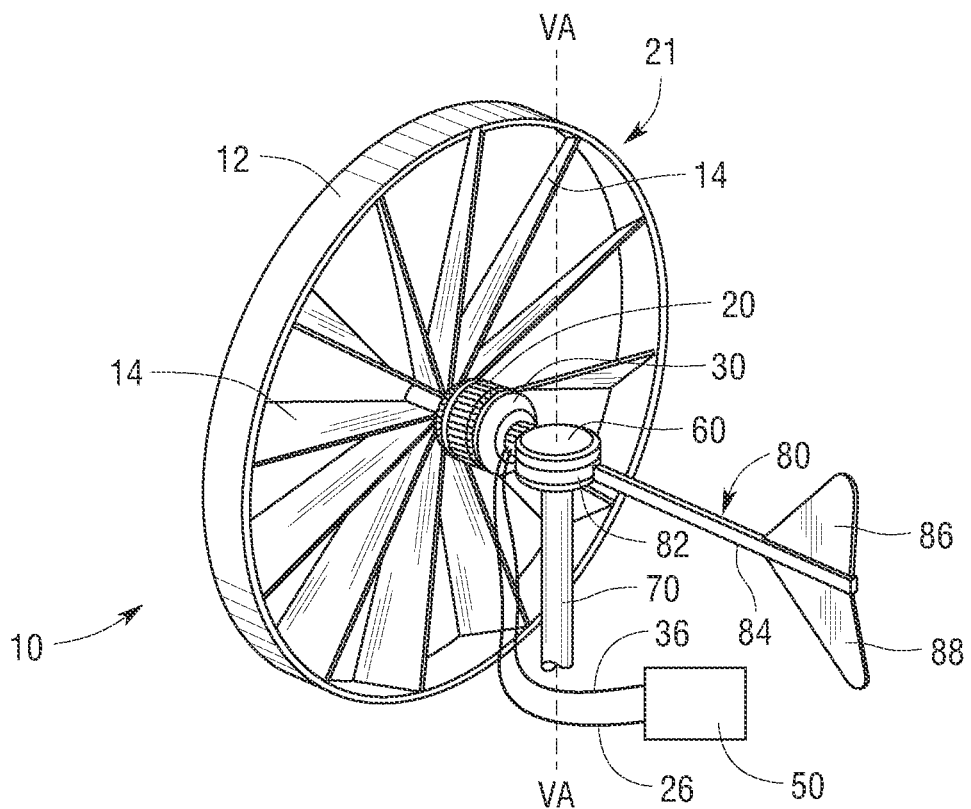
FIG. 2 is a rear perspective view of the wind turbine embodiment of FIG. 1 attached to a support structure.

Certain exemplary embodiments will now be described to provide an overall understanding of the principles of the structure, function, manufacture, and use of the devices and methods disclosed herein. One or more examples of these embodiments are illustrated in the accompanying drawings. Those of ordinary skill in the art will understand that the devices and methods specifically described herein and illustrated in the accompanying drawings are non-limiting exemplary embodiments and that the scope of the various embodiments of the present invention is defined solely by the claims. The features illustrated or described in connection with one exemplary embodiment may be combined with the features of other embodiments. Such modifications and variations are intended to be included within the scope of the present invention.

Turning to the Drawings, wherein like numerals denote like components, there is shown a wind turbine 10 that has an outer ring 12 that has a plurality of blades or fins 14 attached thereto. The number of fins 14 may vary. For example, in one embodiment, twelve fins 14 are employed. However, other numbers of fins 14 may be employed. In various embodiments, the outer ring 12 may be fabricated from a "first" material that may comprise a composite material such as, for example, carbon fiber. However, in other embodiments, the first material may comprise cast aluminum, or, for example, fiberglass.

In various embodiments, the fins 14 are made from a "second" flexible material such as polyurethane or flexible composite materials that are more flexible than the first materials and which will have ends suitable for sliding into or fastening to the ring and rotor. The fins 14 extend from a central rotator bearing 18 that is mounted on a generator input shaft 22 of a first electrical generator 20. In a preferred embodiment, the fins 14 are mounted in tension between the outer ring 12 and the central rotator bearing 18. The central rotator bearing 18 may also be fabricated from the first material. The outer ring 12, the fins 14, and the central rotator bearing 18 are collectively referred to herein as a turbine rotator assembly, generally designated as 21. The flexible nature of the fin material, as well as the fact that they are mounted in tension provides the fins 14 with the ability to flex when they experience a certain level of wind speed. For example, the turbine rotator assembly 21 will be capable of flexing when it encounters wind speeds of approximately 5 miles per hours (MPH) or greater. Such unique and novel arrangement serves to minimize the likelihood of ice accumulating on the turbine rotator assembly 21, because the flexing motion thereof will cause accumulating ice to be "shed" or popped therefrom as the turbine rotator assembly flexes and deflects.

Figure 3:
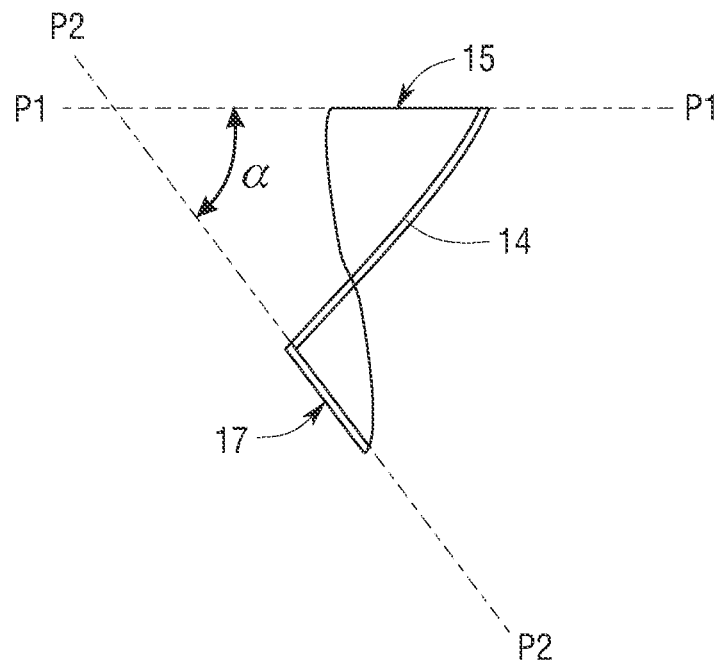
FIG. 3 is a perspective view of a fin mounting orientation of various embodiments of the present invention.

The fins 14 may each be mounted such that they are in a slightly twisted position. More particularly and with reference to FIG. 3, the inner edge 15 of each fin 14 is aligned along plane P1-P1 at its point of attachment to the central rotator bearing 18. The outer edge 17 of each fin 14 lies along a plane P2-P2 at its point of attachment to the outer ring 12. The plane P2-P2 may be oriented at an angle "α" relative to plane P1-P1 as shown in FIG. 3. In various preferred embodiments, angle α may be approximately 45°. In other embodiments, angle α may range from 10° to 60° and may also be curved to increase the shift at different wind speeds.

In a preferred embodiment, the first electrical generator 20 may, for example, comprise a generator manufactured by Delco of General Motors Corporation. However other generators could be employed. In various embodiments, a second electrical generator 30 may be mechanically coupled to the first electrical generator 20 by a conventional clutch assembly generally designated as 25. The first and second electrical generators 20, 30 transmit the electrical current produced thereby through conductor arrangements 26, 36 that are connected to electrical equipment 50 or battery storage which may comprise, for example, radio transmitters and receivers or GNB cell batteries.

In operation, the first electrical generator 20 may generate power of approximately 500 Watts when turning at a speed of approximately 50 revolutions per minute (RPM) to 250 RPMS. At speeds greater than 250 RPMS up to approximately 450 RPMS, the clutch assembly couples the first electrical generator 20 to the second generator 30 to generate power on the order of 1000 Watts. The first and second electrical generators 20, 30 and clutch assembly are generally referred to herein as a "power generation unit 40". In other embodiments, the power generation unit 40 may comprise a single electrical generator 20 (without the clutch assembly and the second electrical generator 30).

The power generation unit 40 may be attached to a tower attachment assembly generally designated as 60. In various embodiments, the tower attachment assembly 60 comprises a housing member 62 that is mounted on a conventional bearing assembly (not shown) that is attached to a support structure in the form of, for example, a monopole 70 to facilitate rotation of the turbine assembly 10 about vertical axis VA-VA defined by the monopole 70. See FIG. 1. A tail assembly 80 is coupled to the tower attachment assembly 60 for steering the turbine assembly 10 into the wind. In some embodiments, for example, the tail assembly 80 is fabricated from aluminum and fiberglass and includes a ring portion 82 that is rotatably supported on the tower attachment assembly 60 and an elongated tail section 84 that protrudes therefrom. Fins 86, 88 are attached to the end of the tail section 84. In various embodiments, the tail assembly 80 is rotatably supported on the tower attachment assembly 60 such that the tail assembly 80 may be substantially perpendicular to the attached to the turbine rotator assembly 21 when encountering wind speeds up to approximately 45 miles per hour ("mph"), for example. However, when wind speeds exceed approximately 45 mph, for example, the tail assembly 80 will rotate to a position wherein the tail assembly 80 is substantially parallel to the turbine rotator assembly 21 to thereby take the turbine rotator assembly 21 out of the path of the wind. Such arrangement serves to prevent damage to the turbine 10 when encountering high wind speeds.

Figure 4:
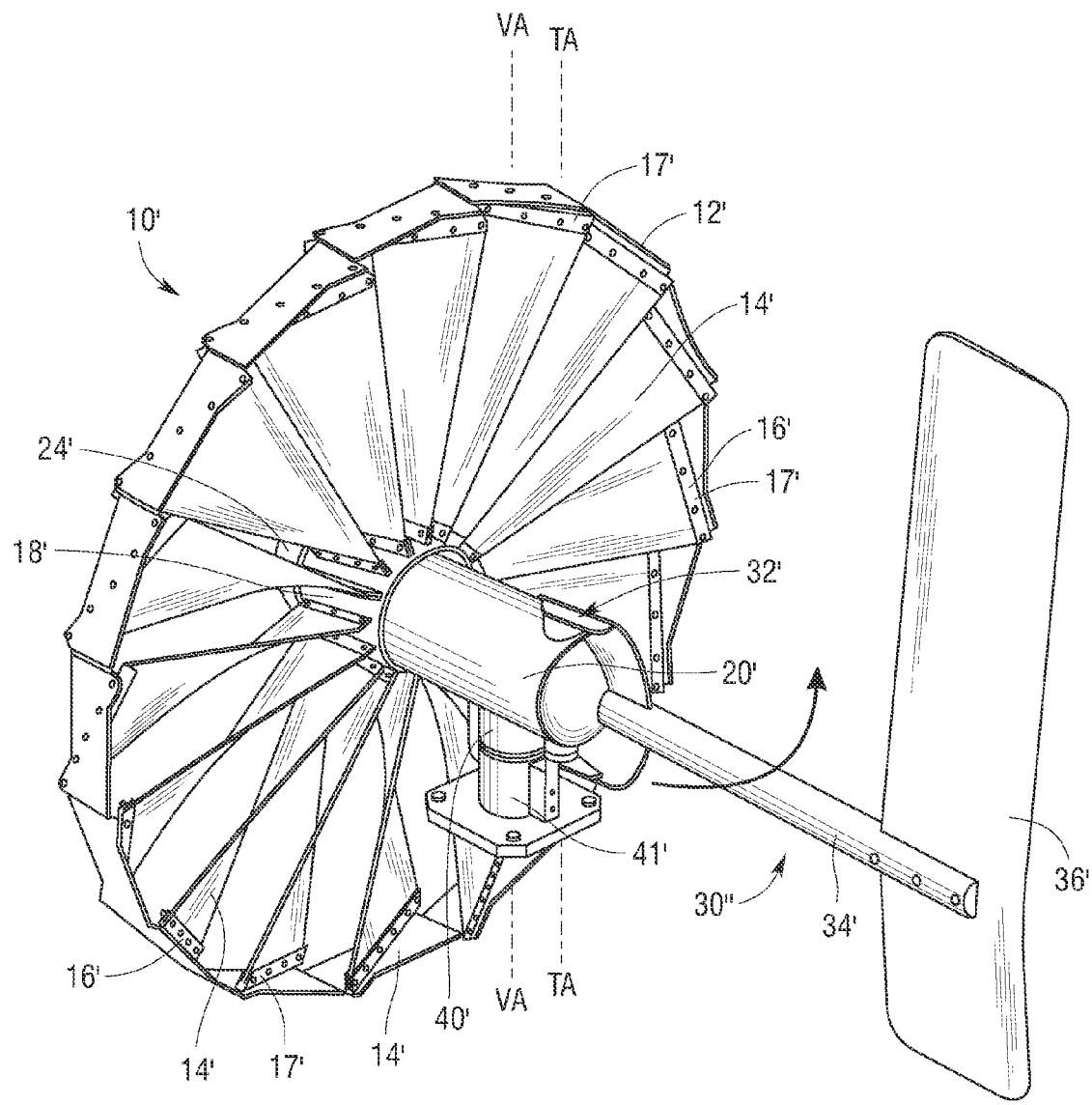
FIG. 4 is a rear perspective view of another wind turbine embodiment of the present invention when encountering wind blowing at a first range of wind speeds.
Figure 5:
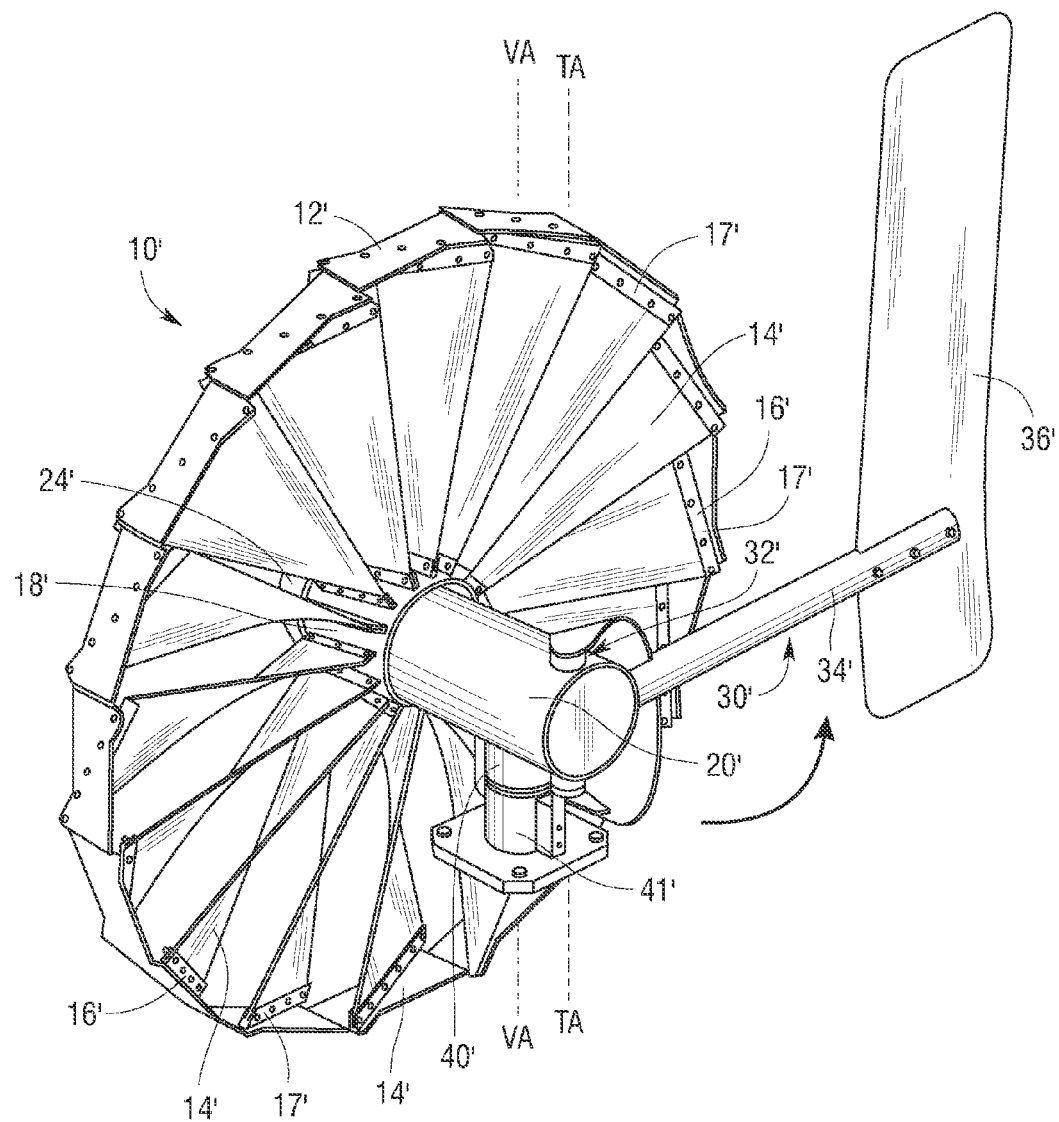
FIG. 5 is another rear perspective view of the wind turbine of FIG. 4 when encountering wind blowing at a wind speed that exceeds the first range of wind speeds.

FIGS. 4 and 5 depict an alternative wind turbine 10' of the present invention. This embodiment includes an outer ring 12' that may be fabricated from a first material of the type described above. A plurality of flexible blades or fins 14' are attached to the outer ring 12' by mounting clips 16' and/or rivets, screws, bolts, etc. 17'. Any suitable number of flexible fins 14' can be employed. In the depicted embodiment, for example, fifteen fins 14' are used. The fins 14' are mounted in tension between the outer ring 12' and a central rotator bearing 18' that is rotatably supported on a housing 20'. The flexible fins 14' may be fabricated from, for example, any of the second materials described above and be attached to the central rotator bearing 18' by mounting clips 16' and fasteners 17'. The outer ring 12', flexible fins 14', and central rotator bearing 18' are collectively referred to herein as a turbine rotator assembly 21'. As noted above, the flexible nature of the fin material, as well as the fact that they are mounted in tension provides the fins 14' with the ability to flex when they experience a certain level of wind speed. For example, the fins 14' will be capable of flexing when they encounter wind speeds of approximately 5 mph or greater. Such unique and novel arrangement serves to minimize the likelihood of ice accumulating on the fins 14', because the flexing motion of the fins 14' will cause accumulating ice to be "shed" therefrom as the fins 14' flex. The fins 14' may also be mounted with a slight twist as was described above.

The housing 20' may comprise a hollow body portion 22' and a nose portion 24'. In various embodiments, the housing 20' may be fabricated from aluminum material. However, housing 20' could be fabricated from other suitable materials. In the depicted embodiment, the nose 24' is attached to the housing 20' apart from the central rotator bearing 18'. A tail assembly, generally designated as 30', may be pivotally attached to the housing 20' such that the tail assembly 30' may pivot about a tail axis TA-TA as shown in FIG. 5. The tail assembly 30' may include a pivot yoke 32' that interacts with a gear assembly within the housing 20' to apply a desired amount of resistance to the tail assembly 30' such that the tail assembly 30' remains substantially axially aligned with the housing 20' (FIG. 4) until the wind speed exceeds a predetermined amount (e.g., greater than 45 mph). The tail assembly 30' may further include a body portion 34' with a tail fin 36' attached thereto.

A support structure in the form of a hollow support mast 40' is attached to the housing 20' by welding or other suitable means. The support mast 40' may be attached to a bearing assembly 41' that is attached to another structure (not shown) to enable the support mast 40' and housing 20' to pivot about vertical axis VA-VA. A generator assembly of a system described below may be housed within the housing 20' and interface with the central rotator bearing 18'.

FIGS. 6-9 depict another wind turbine system 100 of the present invention. The wind turbine system 100 includes a wind turbine 110 that has an outer ring 112 that may be fabricated from a first material of the types described above. A plurality of flexible blades or fins 114 are attached to the outer ring 112 by mounting clips 116 and/or rivets, screws, bolts, etc. 117. Any suitable number of flexible fins 114 can be employed. In the depicted embodiment, for example, nine fins 114 are used. The fins 114 are mounted in tension between the outer ring 112 and a central rotator bearing 118 that is rotatably supported on a housing 120. The flexible fins 114 may be fabricated from, for example, any of the second materials described above and be attached to the central rotator bearing 118 by mounting clips 116 and fasteners 117. The outer ring 112, flexible fins 114, and central rotator bearing 118 are collectively referred to herein as a turbine rotator assembly 121. The fins 114 may be mounted in a somewhat twisted fashion as was described above and depicted in FIG. 3.

The housing 120 may comprise a hollow body portion 122 and a nose portion 124. In various embodiments, the housing 120 may be fabricated from aluminum material. However, housing 120 could be fabricated from other suitable materials. In the depicted embodiment, the nose portion 124 is attached to the housing 120 apart from the central rotator bearing 118. An upper tail fin 130 and lower tail fin 132 are attached to the hollow body portion 122 by clips 134 and/or rivets, screws, bolts, etc. 136 or they may be of welded construction. A support structure in the form of a hollow support mast 140 is attached to the body portion 122 by welding or other suitable means. The lower tail fin 132 may also be attached to the support mast 140 by clips 134 and fasteners 136 as shown. The support mast 140 may be attached to a bearing assembly 141 that is attached to another structure (not shown) to enable the support mast 140 and housing 120 to pivot about vertical axis VA-VA. An access cap 150 may be attached to the body portion 122, by, for example, a threaded connection, slip fit or other suitable arrangement to permit the access cap 150 to be selectively removed from the body portion 122 to permit access to the components therein.

In various embodiments, a hub portion (not shown) of the central rotator bearing 118 is attached to a drive shaft 160 that is supported within the housing 120 by conventional bearings that may be assembled from either end of the housing 120. As shown in schematic form in FIG. 7, a drive sprocket 162 may be attached to the drive shaft 160. A drive chain or other form of endless drive member (e.g. drive belt) 164 is supported on the drive sprocket 162 and is also supported on a driven sprocket 166. Driven sprocket 166 is supported on a secondary shaft 167 that supports a drive sprocket 168 thereon. An endless drive belt or chain 173 is supported on the drive sprocket 168 and a pump sprocket 172 of a hydraulic pump 170. Hydraulic pump 170 may comprise a hydraulic pump manufactured by Cross of 100 Factory Street, Lewis, Kans. under Model No. SP20B30. However, other hydraulic pumps could be successfully employed. Thus, rotation of the central rotator bearing 118 operates the hydraulic pump 170. A hydraulic output line (conduit) 182 is coupled to the hydraulic pump 170 and extends down the support mast 140 to be coupled to a hydraulic motor 190 that is supported in a location relatively remote from the turbine 110. For example, the hydraulic motor 190 may be supported within a building or other enclosure 200 adjacent to the support mast 140. A conventional hydraulic proportioning valve 210 may be coupled to the hydraulic output line (conduit) 182 by line (conduit) 184 and a hydraulic fluid tank 220 by line (conduit) 186. The hydraulic fluid tank 220 may be located within the enclosure 200, for example. The proportioning valve 210 may also be located within the enclosure 200 and may be employed to control fluid flow which can be used to regulate turbine speed so that in high wind speeds (e.g., wind speeds exceeding 50 mph), the hydraulic motor 190 remains at a relatively "safe" rpm (e.g., less than 4000 rpm).

Figure 6:
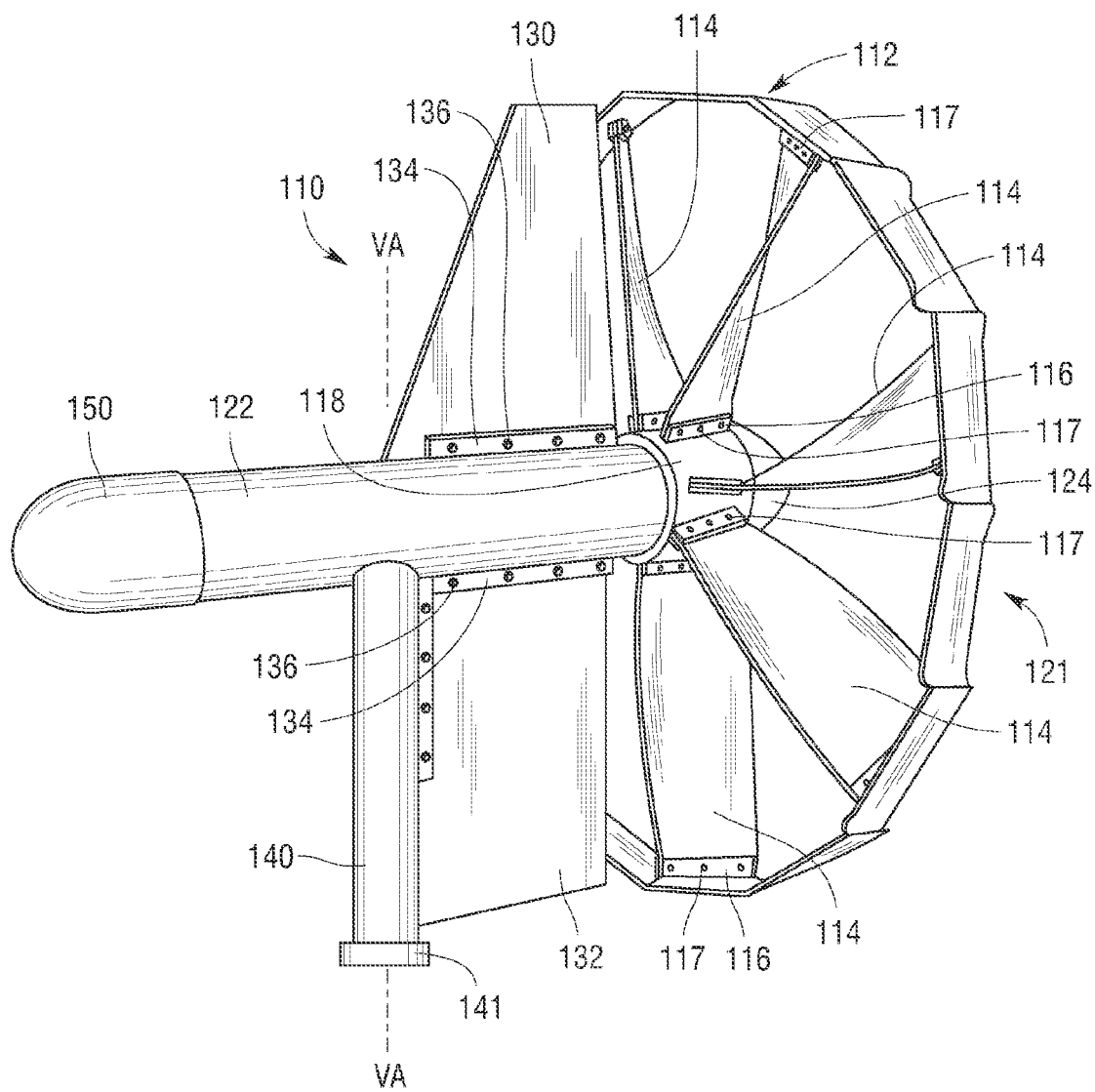
FIG. 6 is a rear perspective view of another wind turbine embodiment of the present invention.
Figure 7:
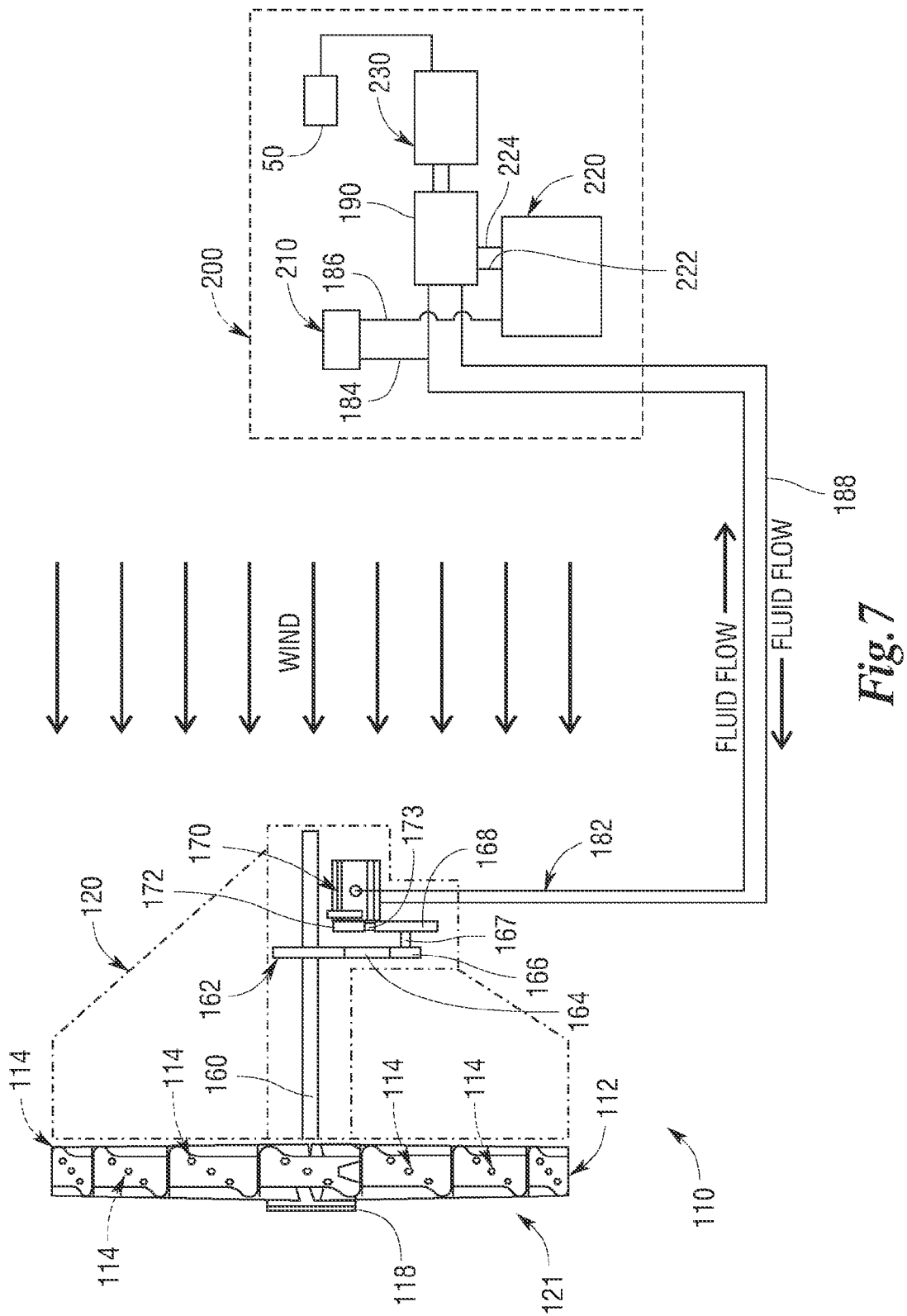
FIG. 7 is a schematic view of a wind turbine control system embodiment of the present invention.

As can also be seen in FIG. 6, a return hydraulic line 188 extends from the hydraulic motor 190 to the hydraulic pump 170. The hydraulic motor 190 is coupled to a conventional electrical generator 230 that may also be located within the enclosure 200. The electrical generator 230 may be coupled to electrical equipment 50 that may also be located within the enclosure 200. From 5 mph wind to 50 mph wind, the hydraulic motor/generator will go from 1125 rpm to 4000 rpm. Above 50 mph, the pressure compensated flow control valve 210 diverts excessive fluid to return to the tank 220 so that the generator 230 stays at a constant speed of approximately 3600 to 400 rpm at wind speeds over 50 mph.

Figure 9:
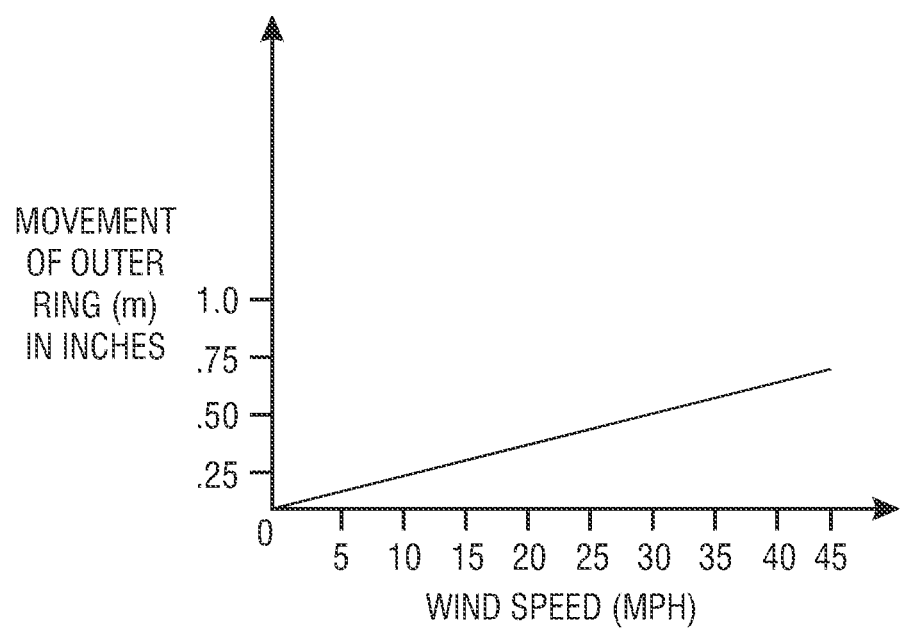
FIG. 9 is a graphical depiction illustrating a relationship between the deflection of the outer ring assembly and wind speed.
Figure 8:
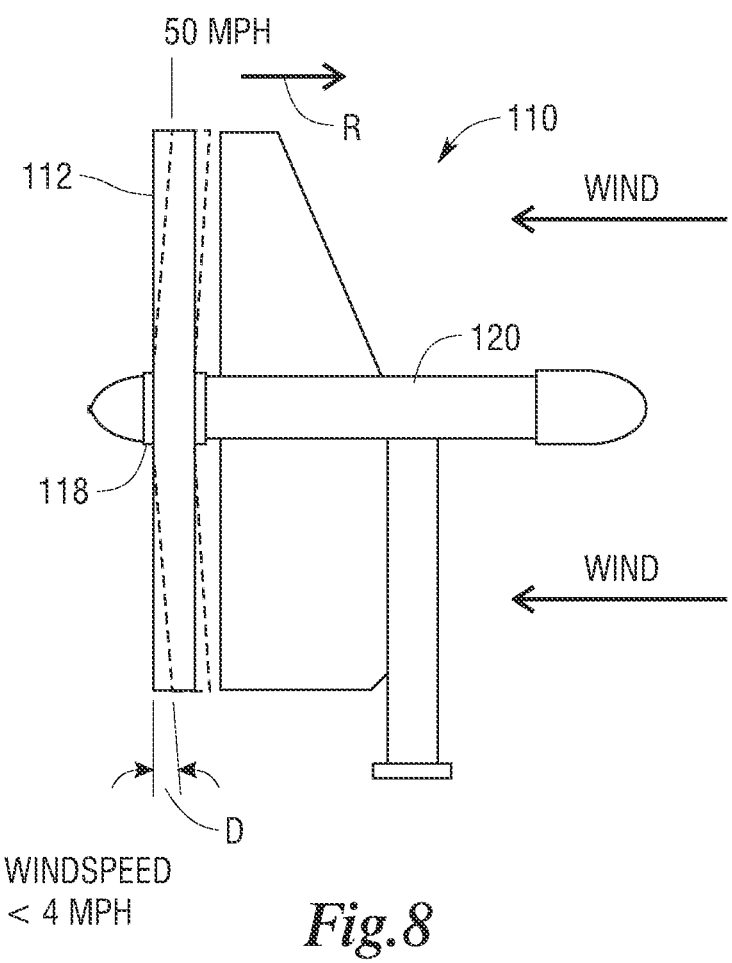
FIG. 8 is a side elevational depiction of a wind turbine of the present invention with the outer ring shown in solid lines when at rest or encountering a wind speed that is less than a predetermined amount and wherein the outer ring is shown in segmented lines when encountering a maximum amount of winds peed.

During testing of the wind turbine 110, it was discovered that, as the wind speeds increased from, for example, 4 mph to 50 mph, the unique and novel nature of the flexible tension mounted fins 114 and the outer ring 112, causes the outer ring 112 of the turbine rotator assembly 121 to actually deflect in direction that is opposite to the direction in which the wind was blowing. This action is depicted in FIG. 8. To perform the test, a measuring device was employed to monitor and measure the amount of outer ring deflection in response to increasing amounts of wind speed. The measuring device cast a laser beam onto the outer ring. The linear distance that the spot formed on the fin by the laser beam moved was observed and recorded as the wind speed increased. During the test, there was no observable deflection for wind speeds less than 4 mph. As wind speeds exceeded 4 mph, the outer ring 112 started to deflect in direction "R" which is opposite to the direction in which the wind was blowing. The deflected outer ring 112 is depicted in dashed lines in FIG. 8. It was observed that this deflection continued as the wind speed increased. During the tests, the turbine 110 was exposed to a maximum 50 mph wind speed at which a deflection of approximately ¾ of an inch (distance "D" in FIG. 8) was observed. FIG. 9 depicts in graphic form, the amount of deflection observes in relation to the wind speed. Although FIG. 9 depicts a linear relationship between deflection and wind speed, the relationship may be non-linear.

This somewhat unexpected deflection of the outer ring 112 and fins 114 (the turbine rotator assembly 121) provides unique and novel advantages over prior designs. For example, this deflection of the flexible fins 114 with the outer ring 112 serves to discourage accumulation of ice on the turbine rotator assembly 121. That is, as a layer of ice may develop on the fins and outer ring 112 during times of low or non-existent wind speeds, when the unit experiences increases in wind speeds, the fins 114 and outer ring 112 will start to flex and deflect which will cause the accumulated film of ice to "pop" off of the fins 114 and outer ring 112. This can be particularly advantageous when the turbine 110 is employed in remote locations wherein maintenance personnel are not readily available to monitor and, if necessary, remove debilitating and damaging ice accumulations from the unit.

Another unique and novel advantage of various embodiments of the present invention is that the deflection of outer ring 112 in a direction that is opposite to the direction in which the wind is blowing serves to counter the amount of wind load being experienced by the mast, pole or other support structure that is supporting the turbine 110. Thus, the masts and other support structures may be designed and fabricated from lighter, less expensive materials than would have otherwise been employed with different wind turbine designs.

FIGS. 10-12 illustrate another turbine rotator assembly 321 that may be employed in connection with any of the wind turbine embodiments of the present invention. As can be seen in those Figures, the turbine rotator assembly 321 may include an outer ring 312 and a central rotator bearing or hub 318. In various embodiments, the outer ring 312 may be cast from aluminum or other suitable material. The outer ring 312 may be fabricated from a plurality of ring segments 313 that are pinned or otherwise attached together to form an endless ring. Such arrangements serve to facilitate ease of manufacturing the endless ring 312.

Figure 13:
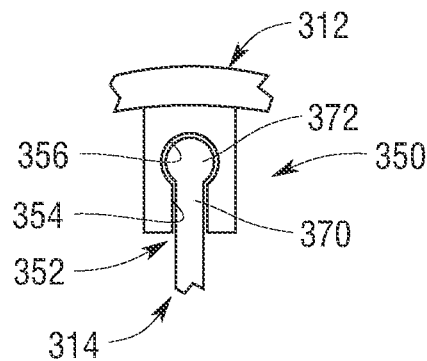
FIG. 13 illustrates an outer fin retention member embodiment of the present invention retaining a portion of a corresponding fin.

The embodiment of the turbine rotator assembly 321 depicted in FIGS. 10-12 also employs a unique an novel method for attaching the fins 314 to the outer ring 312 and the central rotator bearing 318 that enables the fins 314 to be easily and quickly attached in tension and detached therefrom without the use of tools. In particular, each ring segment 313 may have two outer fin retention members 350 cast therein or otherwise attached thereto. Each outer fin retention member 350 has a slot 352 formed therein as shown in FIG. 13. As can be seen in that Figure, the slot 352 has a neck portion 354 and a circular bottom portion 356 for retaining an outer end 370 of a corresponding fin 314. A semi circular outer retention protrusion 372 may be attached to or molded adjacent to the outer end 370 of the fin 314 as shown in FIG. 13. Thus, the outer end 370 of the fin 314 may be attached to the outer ring 312 simply by sliding the outer end 370 into the slot 352 as shown in FIG. 13.

Figure 14:
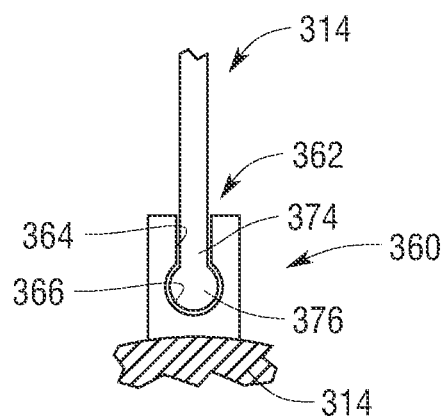
FIG. 14 illustrates an inner fin retention member embodiment of the present invention retaining a portion of a corresponding fin.

In various embodiments, the central rotator bearing 318 may be cast from aluminum or other suitable material and have a plurality of inner fin retention members 360 formed thereon that correspond to the number of fins 314. As can be seen in FIG. 14, each inner fin retention member 360 has a slot 362 therein. Each slot 362 has a neck portion 364 and a circular bottom portion 366 for retaining an inner end 374 of a corresponding fin 314 therein. Each fin 314 may have an inner retention protrusion 376 attached or molded thereto adjacent the inner end 374 of the fin 314. Such arrangement permits the fins 314 to be easily installed between the inner bearing member 318 by and the outer ring 312 simply by sliding the outer end 370 into a corresponding outer slot 352 such that the outer retention protrusion 372 is received in the circular bottom portion 356 of the slot 352. Similarly, the inner end 374 of the fin 314 is slid into a corresponding inner slot 362 such that the inner retention protrusion 376 is received in the circular bottom portion 366 of the slot 362. Such arrangement retains the fins 314 in tension between the inner bearing member 318 and the outer ring 312 while retaining the fin 314 in a twisted orientation and with outer portion of the fin 314 having a curved orientation as was discussed above. Corresponding slots 356, 366 may be oriented relative to each other such that each fin 314 when installed between the inner bearing member 318 and the outer ring 312, is oriented at an angle "α" (FIG. 3) of approximately 57°. In addition, each fin 314 is oriented in a twist with the outer portion 380 of the fin 314 being curved with a radius "R" of approximately 10 inches that is established by outer slot 356. See FIG. 12. Such fin configurations and mounting arrangement further enhances the ability of the outer ring 312 to deflect in a direction that is opposite to the wind direction and thereby achieve the advantages discussed above.

Figure 15:
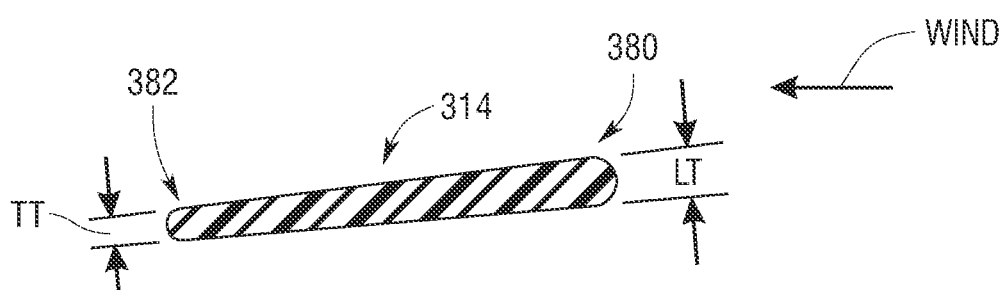
FIG. 15 is a cross-sectional view of a fin embodiment of the present invention.

Various embodiments of the wind turbine rotator assembly 321 employ fins 314 that may be fabricated from polyethylene. In one embodiment, for example, the leading edge 380 of each fin 314 may be thicker in cross-section than the trailing edge 382. For example, as illustrated in FIG. 15, the thickness "LT" of the leading edge 380 is greater than the thickness "TT" of the trail edge 382, such that the fin 314 resembles an airfoil or airplane wing. In one embodiment, the thickness "LT" of the leading edge 380 may be ³⁄₁₆" and the trailing thickness "TT" of the trailing edge 382 may be ¹⁄₁₆". As used herein, the term "leading edge" refers to the edge of the fin that is facing the wind. See FIG. 15.

Such wind turbine systems of the present invention represent a vast improvement over prior wind turbine arrangements particularly when used in remote locations wherein the turbine may be routinely exposed to ice and high winds and is infrequently visited by maintenance personnel. The flexible turbine fins that are mounted in tension between the outer ring and the central rotator bearing are able to flex so that iced build up is minimal.

The particular utility provided by the various embodiments of the present invention is not limited to uses in remote areas, however. Indeed, the various embodiments of the present invention may also be effectively employed on residences and business structures alike to provide electrical power that may be used for a myriad of different purposes.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The invention which is intended to be protected is not to be construed as limited to the particular embodiments disclosed. The embodiments are therefore to be regarded as illustrative rather than restrictive. Variations and changes may be made by others without departing from the spirit of the present invention. Accordingly, it is expressly intended that all such equivalents, variations and changes which fall within the spirit and scope of the present invention as defined in the claims be embraced thereby.

What is claimed is:

1. A wind turbine comprising:
   a housing;
   a power generation unit supported by said housing; and
   a turbine rotator assembly comprising:
      a central rotator bearing rotatably supported on said housing and interacting with said power generation unit such that rotation of said central rotator bearing provides rotational input motion to said power generation unit; and
      a plurality of flexible, non-fabric fins attached in tension between said central rotator bearing and an outer ring, such that when said fin assembly encounters wind blowing in a first direction at a speed greater than a first wind speed, said outer ring will deflect in a second direction that is opposite to the first direction.

2. The wind turbine of claim 1 wherein said outer ring is fabricated from a first material wherein said plurality of fins are manufactured from a second flexible material that differs from said first material.

3. The wind turbine of claim 1 wherein said first material comprises material selected from the group of materials comprising: aluminum, carbon fiber composite material or fiberglass and said second material comprises material selected from the group of materials comprising: polyurethane and a composite material that is more flexible than the first composite material.

4. The wind turbine of claim 1 wherein said power generation unit comprises at least one electrical generator.

5. The wind turbine of claim 1 wherein said power generation unit comprises:
   a hydraulic pump operably coupled to said central rotator bearing for receiving said rotational input motion therefrom;
   a hydraulic motor operably coupled to said hydraulic pump; and
   an electrical generator operably coupled to said hydraulic motor.

6. The wind turbine of claim 5 wherein said central rotator bearing is rotatably supported on a housing and wherein said hydraulic pump is operably coupled to said central rotator bearing by a drive assembly supported within said housing.

7. The wind turbine of claim 6 wherein said drive assembly comprises:
   a first drive shaft coupled to said central rotator bearing for rotational travel therewith;
   a drive sprocket coupled to said drive shaft;
   a driven sprocket supported on a secondary shaft;

an endless drive member extending between said drive sprocket and said driven sprocket;
a drive sprocket coupled to said secondary shaft; and
a pump gear coupled to said hydraulic pump and in meshing engagement with said drive gear by a second endless member.

8. The wind turbine of claim 5 wherein said hydraulic pump is coupled to said hydraulic motor by hydraulic lines and wherein said wind turbine further comprises means for adjusting flow of hydraulic fluid from said hydraulic pump to said hydraulic motor.

9. The wind turbine of claim 8 wherein said hydraulic motor is hydraulically coupled to a hydraulic fluid tank and wherein said means for adjusting flow comprises a proportioning valve hydraulically coupled to a hydraulic supply line coupled between said hydraulic pump and said hydraulic motor, said proportioning valve further being hydraulically coupled to said hydraulic fluid tank.

10. The wind turbine of claim 9 wherein said proportioning valve, said hydraulic fluid tank, said hydraulic motor, and said electrical generator are located remote from said housing.

11. A wind turbine comprising:
a tower attachment assembly;
a power generation unit mounted to said tower attachment assembly;
a central rotator bearing operably coupled to said power generation unit such that rotation of said central rotator bearing provides rotational input motion to said power generation unit;
an outer ring fabricated from a first material; and
a plurality of fins attached to said outer ring and said central rotator bearing, said plurality of fins being manufactured from a second flexible non-fabric material and mounted in tension between said outer ring and said central rotator bearing such that said plurality of fins flex in response to encountering a range of wind speeds.

12. The wind turbine of claim 11 wherein said first material comprises material selected from the group of materials comprising: aluminum, carbon fiber composite material or fiberglass and said second material comprises material selected from the group of materials comprising: polyurethane and a composite material that is more flexible than the first composite material.

13. The wind turbine of claim 11 wherein said power generation unit comprises at least one electrical generator.

14. The wind turbine of claim 11 wherein said power generation unit comprises:
a first electrical generator; and
a second electrical generator operably coupled to said first electrical generator by a clutch assembly.

15. The wind turbine of claim 11 further comprising a tail assembly coupled to said tower attachment assembly.

16. The wind turbine of claim 15 wherein said tail assembly comprises:
an elongated tail section coupled to said tower attachment assembly; and
at least one tail fin attached to said elongated tail section.

17. The wind turbine of claim 16 wherein said outer ring, said plurality of fins, and said central rotator bearing comprises a turbine rotator assembly and wherein said elongated tail section is mounted to said tower attachment assembly such that said elongated tail section is substantially perpendicular to said turbine rotator assembly when said turbine rotator assembly encounters a first range of wind speeds and wherein said elongated tail section is substantially parallel to said turbine rotator assembly at wind speeds greater than said first range of wind speeds.

18. The wind turbine of claim 11 wherein said tower attachment assembly is coupled to a support structure such that said tower support assembly is free to rotate about a vertical axis defined by said support structure.

19. The wind turbine of claim 18 wherein said support structure comprises a monopole.

20. A wind turbine comprising:
a tower attachment assembly;
a first electrical generator operably coupled to a second electrical generator, said first and second electrical generators supported by said tower attachment assembly;
a turbine rotator assembly comprising:
a central rotator bearing operably coupled to said first electrical generator such that rotation of said central rotator bearing provides rotational input motion to said an outer ring fabricated from a first material; and
a plurality of fins attached to said outer ring and said central rotator bearing, said plurality of fins being manufactured from a second flexible material and being mounted in tension between said outer ring and said central rotator bearing such that said plurality of fins flex in response to encountering a range of predetermined wind speeds and wherein said wind turbine further comprises an elongated tail section operably coupled to said tower attachment assembly such that said elongated tail section is substantially perpendicular to said turbine rotator assembly when said turbine rotator assembly encounters a first range of wind speeds and wherein said elongated tail section is substantially parallel to said turbine rotator assembly at wind speeds greater than said first range of wind speeds; and
at least one tail fin coupled to said elongated tail section.

21. A wind turbine comprising:
a housing;
a support structure mounted to said housing for facilitating rotational travel of said housing about a vertical axis;
a turbine rotator assembly rotatably supported on said housing for rotational travel relative thereto in response to contact by wind, said turbine rotator assembly comprising:
a central rotator bearing rotatably supported on said housing;
an outer ring fabricated from a first material; and
a plurality of fins attached to said outer ring and said central rotator bearing, said plurality of fins being manufactured from a second flexible material and being mounted in tension between said outer ring and said central rotator bearing such that said plurality of fins flex in response to encountering a range of predetermined wind speeds and wherein said wind turbine further comprises a power generation unit comprising:
a drive shaft rotatably supported within said housing and coupled to said central rotator bearing;
a drive sprocket coupled to said drive shaft;
a driven sprocket supported on a secondary shaft;
a drive chain extending between said drive sprocket and said driven sprocket;
a drive gear coupled to said secondary shaft;
a pump gear coupled to a hydraulic pump and in meshing engagement with said drive gear;
a hydraulic motor operably coupled to said hydraulic pump by a hydraulic supply line and a hydraulic return line;
a hydraulic fluid tank in hydraulic communication with said hydraulic motor;

a proportioning valve in hydraulic communication with said hydraulic supply line and aid hydraulic fluid tank; and an electrical generator operably coupled to said hydraulic motor and wherein said wind turbine further comprises at least one tail fin coupled to said housing.

22. A wind turbine comprising:
a housing;
a power generation unit supported by said housing;
a turbine rotator assembly comprising:
  a central rotator bearing rotatably supported on said housing and interacting with a power generation unit such that rotation of said central rotator bearing provides rotational input motion to said power generation unit; and
  a plurality of flexible fins attached in tension between said central rotator bearing and an outer ring, such that when said fin assembly encounters wind blowing in a first direction at a speed greater than a first wind speed, said outer ring will deflect in a second direction that is opposite to the first direction and wherein said power generation unit
comprises:
  a hydraulic pump operably coupled to said central rotator bearing by a drive assembly supported within said housing for receiving said rotational input motion therefrom;
  a hydraulic motor operably coupled to said hydraulic pump; and
an electrical generator operably coupled to said hydraulic motor and wherein said drive assembly comprises:
  a first drive shaft coupled to said central rotator bearing for rotational travel therewith;
  a drive sprocket coupled to said drive shaft;
  a driven sprocket supported on a secondary shaft;
  an endless drive member extending between said drive sprocket and said driven sprocket;
  a drive sprocket coupled to said secondary shaft; and
  a pump gear coupled to said hydraulic pump and in meshing engagement with said drive gear by a second endless member.

23. A wind turbine comprising:
a housing;
a power generation unit supported by said housing; and
a turbine rotator assembly comprising:
  a central rotator bearing rotatably supported on said housing and interacting with said power generation unit such that rotation of said central rotator bearing provides rotational input motion to said power generation unit; and
  a plurality of flexible fins attached in tension between said central rotator bearing and an outer ring, such that when said fin assembly encounters wind blowing in a first direction at a speed greater than a first wind speed, said outer ring will deflect in a second direction that is opposite to the first direction and wherein said power generation unit
comprises:
  a hydraulic pump operably coupled to said central rotator bearing for receiving said rotational input motion therefrom;
  a hydraulic motor operably coupled to said hydraulic pump and a hydraulic fluid tank by hydraulic lines; and an electrical generator operably coupled to said hydraulic motor and wherein said wind turbine further comprises means for adjusting flow of hydraulic fluid from said hydraulic pump to said hydraulic motor, said means for adjusting comprising a proportioning valve hydraulically coupled to a hydraulic supply line coupled between said hydraulic pump and said hydraulic motor, said proportioning valve further being hydraulically coupled to said hydraulic fluid tank and wherein said proportioning valve, said hydraulic fluid tank, said hydraulic motor, and said electrical generator are located remote from said housing.

24. A wind turbine comprising:
a tower attachment assembly;
a power generation unit mounted to said tower attachment assembly, said power generation unit comprising:
  a first electrical generator; and
  a second electrical generator operably coupled to said first electrical generator by a clutch assembly and wherein said wind turbine further comprises:
a central rotator bearing operably coupled to said power generation unit such that rotation of said central rotator bearing provides rotational input motion to said power generation unit;
an outer ring fabricated from a first material; and
a plurality of fins attached to said outer ring and said central rotator bearing, said plurality of fins being manufactured from a second flexible material and mounted in tension between said outer ring and said central rotator bearing such that said plurality of fins flex in response to encountering a range of wind speeds.

25. A wind turbine comprising:
a tower attachment assembly;
a power generation unit mounted to said tower attachment assembly;
a central rotator bearing operably coupled to said power generation unit such that rotation of said central rotator bearing provides rotational input motion to said power generation unit;
an outer ring fabricated from a first material;
a plurality of fins attached to said outer ring and said central rotator bearing, said plurality of fins being manufactured from a second flexible material and mounted in tension between said outer ring and said central rotator bearing such that said plurality of fins flex in response to encountering a range of wind speeds;
a tail assembly coupled to said tower attachment assembly, said tail assembly comprising:
an elongated tail section coupled to said tower attachment assembly; and
at least one tail fin attached to said elongated tail section and wherein said outer ring, said plurality of fins, and said central rotator bearing comprises a turbine rotator assembly and wherein said elongated tail section is mounted to said tower attachment assembly such that said elongated tail section is substantially perpendicular to said turbine rotator assembly when said turbine rotator assembly encounters a first range of wind speeds and wherein said elongated tail section is substantially parallel to said turbine rotator assembly at wind speeds greater than said first range of wind speeds.

* * * * *